Aug. 28, 1934.  J. ZETSCHE ET AL  1,971,803
CONTROL OF ELECTRIC MOTORS
Filed July 9, 1930   2 Sheets-Sheet 1
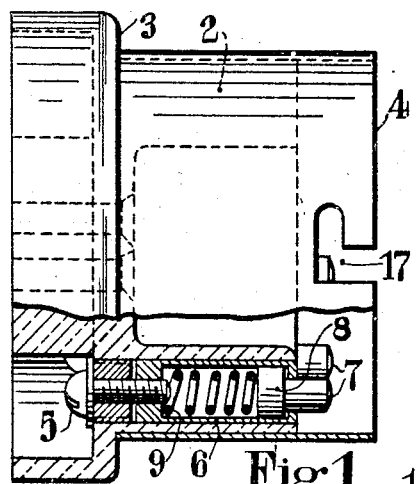
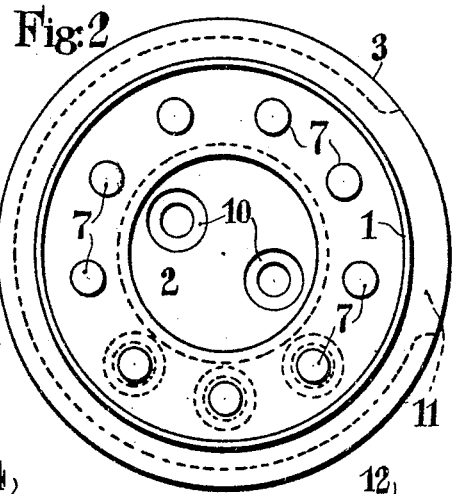
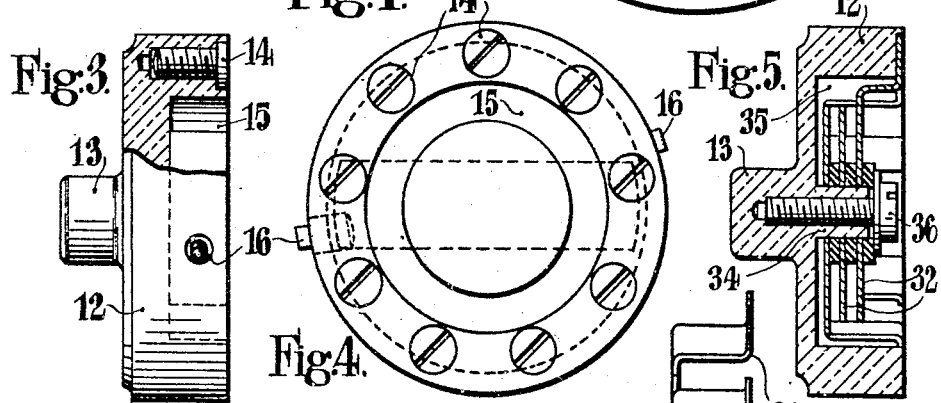
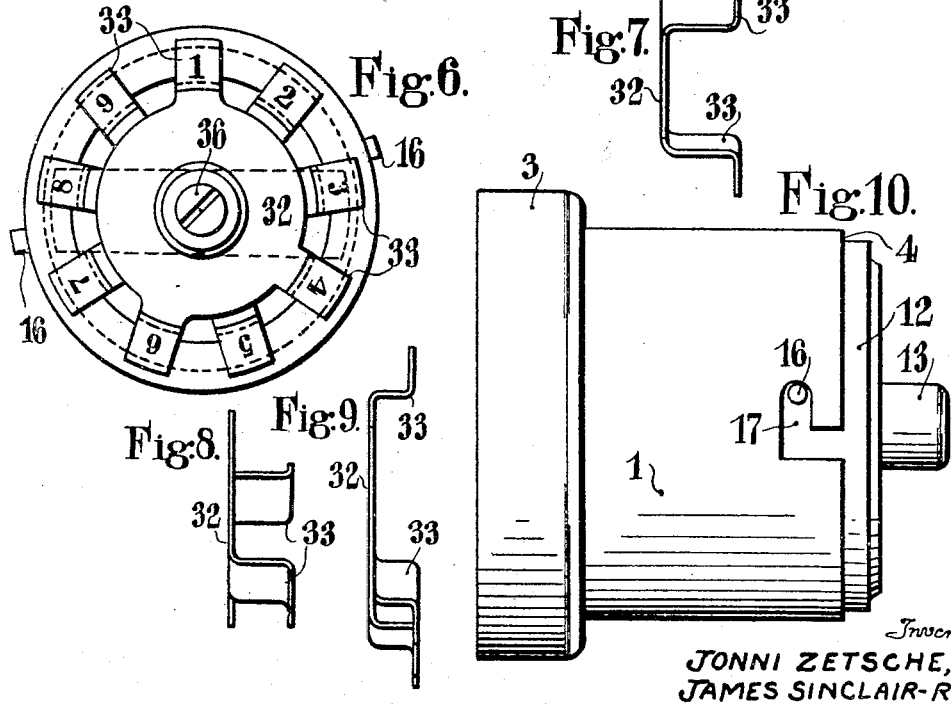
Inventors
JONNI ZETSCHE,
JAMES SINCLAIR-ROSS,
BY Toulmin & Toulmin
Attorneys Aug. 28, 1934.  J. ZETSCHE ET AL  1,971,803
CONTROL OF ELECTRIC MOTORS
Filed July 9, 1930  2 Sheets-Sheet 2
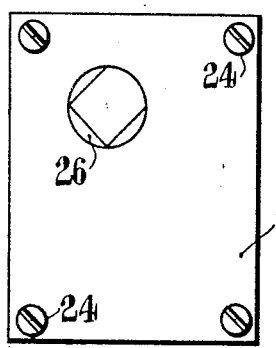
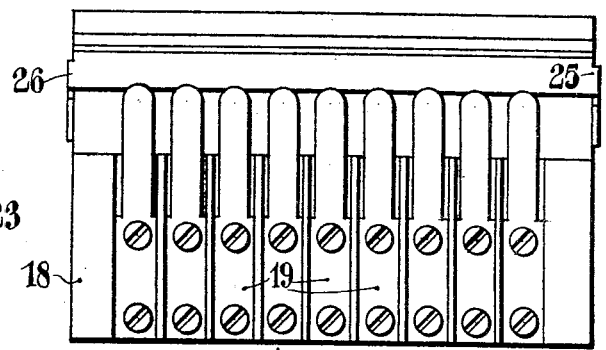
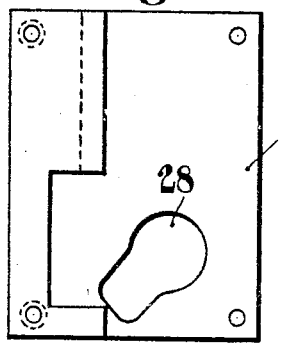
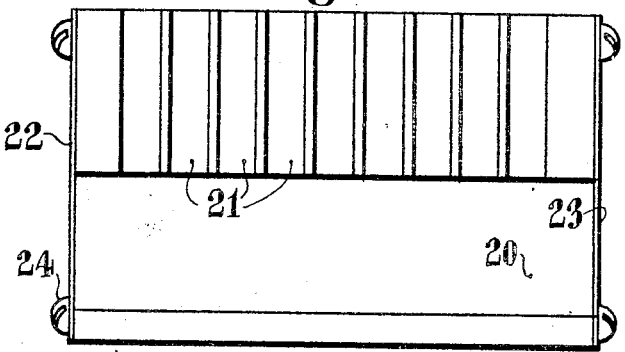
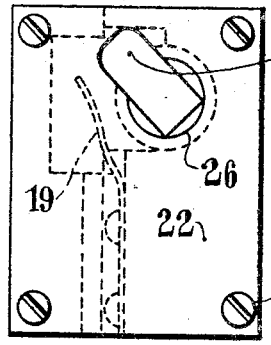
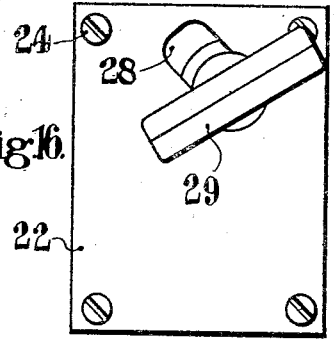
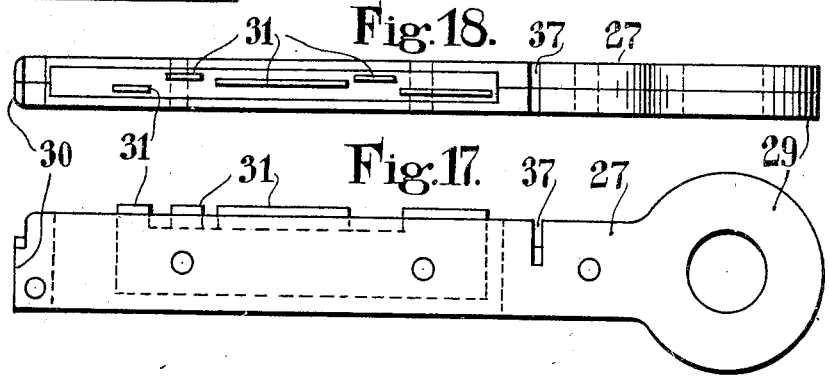
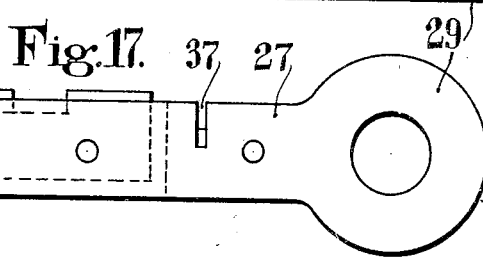

Patented Aug. 28, 1934

1,971,803

UNITED STATES PATENT OFFICE 1,971,803

CONTROL OF ELECTRIC MOTORS

Jonni Zetsche, Hamburg, Germany, and James Sinclair-Ross, London, England

Application July 9, 1930, Serial No. 466,787
In Great Britain July 10, 1929

2 Claims. (Cl. 173—328)

This invention relates to apparatus for the control of electric motors and has for its object to provide apparatus of this kind adapted to be safely operated by any inexperienced person and to enable a single standard construction of motor to be operated upon various voltages of supply and with different kinds of current.

The apparatus according to the invention comprises a casing, a number of fixed contact fingers therein adapted to be connected by wires to the windings of the motor, an opening in the casing, and a number of separate keys or the like each provided with one or more insulated contact pieces and adapted to be passed into the opening in the casing and to be moved into an operative position therein to interconnect certain of the fixed contact fingers.

Convenient forms of the apparatus according to the invention are illustrated in the accompanying drawings, in which Figs. 1-10 illustrate one form and Figs. 11-18 another form.

Fig. 1 is a partly sectionally broken side view showing the casing of the apparatus;

Fig. 2 is an end view of the casing shown in Fig. 1;

Fig. 3 is a partly sectionally broken side view of a key adapted to be inserted in the casing shown in Figs. 1 and 2;

Fig. 4 is an elevation of the inner face of the key shown in Fig. 3;

Fig. 5 is a central section of a modified form of the key shown in Fig. 3;

Fig. 6 is an elevation of the inner face of the key shown in Fig. 5;

Figs. 7-9 illustrate cross-connecting parts for use with the form of key shown in Figs. 5 and 6;

Fig. 10 is a side view showing a key in operative position in a casing as illustrated in Figs. 1 and 2;

Fig. 11 is an end view of the casing of another form of the apparatus;

Fig. 12 is a side view of the casing when the cover is removed;

Fig. 13 is an underside view of the cover of the casing;

Fig. 14 is an end view of the casing with one end cheek removed;

Fig. 15 is an end view of the complete casing showing the opening for the key and the recess for the guide cylinder;

Fig. 16 is an end view corresponding to Fig. 15 showing the key inserted and in the operative position;

Figs. 17 and 18 are respectively a side and edge view of a key adapted to be inserted in the casing illustrated in Figs. 11-16.

Referring to Figs. 1 to 10, in this form the casing of the apparatus consists of a brass cylinder 1 fixed in any suitable manner to a block 2 of insulating material, such as ebonite, having a cup-shaped enlargement 3 projecting beyond and closing one end of the brass cylinder 1. The other end 4 of the brass cylinder is open and projects to a certain extent beyond the insulating block 2. Arranged in a circle within the cup-shaped enlargement 3 of the insulating block 2 is a set of terminals 5 (Fig. 1) to which wires from the motor circuit may be connected. These terminals 5 project inwardly into tubes 6 arranged in channels formed in the block 2.

The tubes 6 also contain a set of spring contacts 7 arranged in a circle and projecting towards the open end 4 of the brass cylinder 1, each contact 7 having an enlargement 8 acted upon by a spring 9 arranged between the said enlargement and the corresponding terminal 5. The tubes 6 are preferably of brass and the enlargements 8 of the contacts 7 slide in said tubes in electrical contact therewith so that the terminals 5 are in electrical connection with the contacts 7 through the brass tubes 6. If desired the said electrical connection may be established partly or wholly through the springs 9.

Holes 10 are provided in the insulating block 2 enabling the block to be secured by screws to a convenient base, while an opening 11 may be left in the wall of the cup-shaped enlargement 3 of the block to enable the circuit wires to be passed laterally into the enlargement for connection to the terminals 5.

Referring to Figs. 3 and 4, a circular key 12 of insulating material is shown herein adapted to be passed into the open end 4 of the casing 1 and having a handle 13 on the outer side and a set of terminals 14 arranged in a circle on the inner side and adapted to make electrical contact with the spring contacts 7 in the insulating block 2. The terminals 14 may be, as shown, in the form of flat-headed screws secured in the body of the key 12, and may be cross-connected among themselves by wires in any desired manner. An annular recess 15 is formed on the inner side of the key 12 to accommodate the said cross-connecting wires (not shown).

Any desired number of keys 12 may be provided for a single casing 1 and the cross-connections between the terminals 14 would be different in each key from the cross-connections in each other key, according to the range of different voltages at which it may be desired to operate the motor, or the different speeds at which it must rotate at any voltage.

Instead of employing separately fixed terminals 14 cross-connected by wires accommodated in the annular recess 15 a set of contact discs such as those shown in Figs. 5, 6, 7, 8 and 9 may be adopted, thereby avoiding the necessity for fixing separate terminals such as 14, as the terminals and the cross-connections are combined in one piece. Each contact disc 32 is provided with arms 33 which are bent up at the ends to form contacts adapted to engage the desired number of spring contacts 7 in the insulating block 2. Each disc 32 is also provided with a hole fitting over the central boss 34 of the key 12 so that the discs 32 can be packed within the recess 35 of the key by stringing their central holes over the boss 34, the discs being separated from one another by suitable insulation and secured in position by a screw 36.

Figs. 7 to 9 show the arrangement of the disc 32 adapted to cross-connect three separate combinations of predetermined numbers of the spring contacts 7.

In order to secure the keys in operative position in the casing 1 each key is provided with pins 16 on its exterior adapted to enter bayonet slots 17 provided in the edge of the open end 4 of the casing, as shown in Fig. 10.

Referring to Figs. 11 to 18, in the form shown herein the casing of the apparatus is constituted by a rectangular block 18 of ebonite or the like hard insulating material, upon which is secured a straight row of contacts 19. The contacts 19 are covered and secured by a cover 20 the underside of which is shown in Fig. 13 and which is provided with grooves 21 arranged to cover the contacts 19. The cover 20 is secured in position over the casing 18 by means of brass end cheeks 22, 23 which are fixed upon the ends of the casing and cover by means of screws 24.

A longitudinal groove 25 runs from end to end of the rectangular block 18 adjacent the operative or flexible portions of the contacts 19 and in this groove rotates a guide cylinder of brass 26 adapted to receive a straight key 27 such as is shown in Figs. 17 and 18. Fig. 15 shows in full lines the entry slot 28 for the key in the brass end cheek 22, also the end of the guide cylinder 26, while Fig. 16 shows the key 27 inserted in the guide cylinder and turned into its operative position.

Referring to Figs. 17 and 18, the key 27 illustrated herein may be of insulating material and has a handle 29 and a front or entry end 30. In the central part of the key contact pieces 31 are disposed so as to interconnect certain predetermined contacts 19 when the key is inserted in the casing 18 and turned into the position shown in Fig. 16. A groove 37 is provided on one edge of the key and is so arranged that on the key being turned into the operative position shown in Fig. 16 the groove 37 embraces the thickness of the adjacent brass end cheek 22. Any number of the keys 27 may be provided and the arrangement of the contact pieces 31 will of course be different on each key from the arrangement on each other key, the number of keys employed depending upon the number of the connections and combinations of the windings of the motor to be controlled.

In the following claims the term "key" wherever it is used is to be understood as applicable to any device which, while separate from the casing, is adapted to be inserted in the casing and to be placed in a position therein closing the motor circuit, and to be again removed from the casing at will.

What we claim and desire to secure by Letters Patent is:—

1. In an apparatus for the control of electric motors comprising the combination with a hollow casing having an opening therein adapted to receive any key of a plurality of replaceable keys having differently arranged contact pieces, of a plurality of insulated contacts fixed to said casing and adapted to have a plurality of separate circuits connected from said contacts to the windings of an electric motor, a replaceable key adapted to fit into the opening in the casing when vacant and cooperating means on said key and casing to cause an interlocking connection when said means are relatively rotated therein, and cross connecting means on the key for interconnecting a predetermined group of the contacts in the casing, said group being less than all the contacts.

2. In a switch device, a casing having in one end a plurality of fixed contacts and in its other end a plurality of resiliently mounted contacts, a key member adapted to fit in the casing adjacent the last-named contacts, said key having a recess with a central boss therein, and a plurality of contact discs on said boss insulated from each other, each disc having contact arms thereon adapted to engage said resiliently mounted contacts when the key is inserted in the casing.

JONNI ZETSCHE.
JAMES SINCLAIR-ROSS.